Patented Mar. 1, 1932

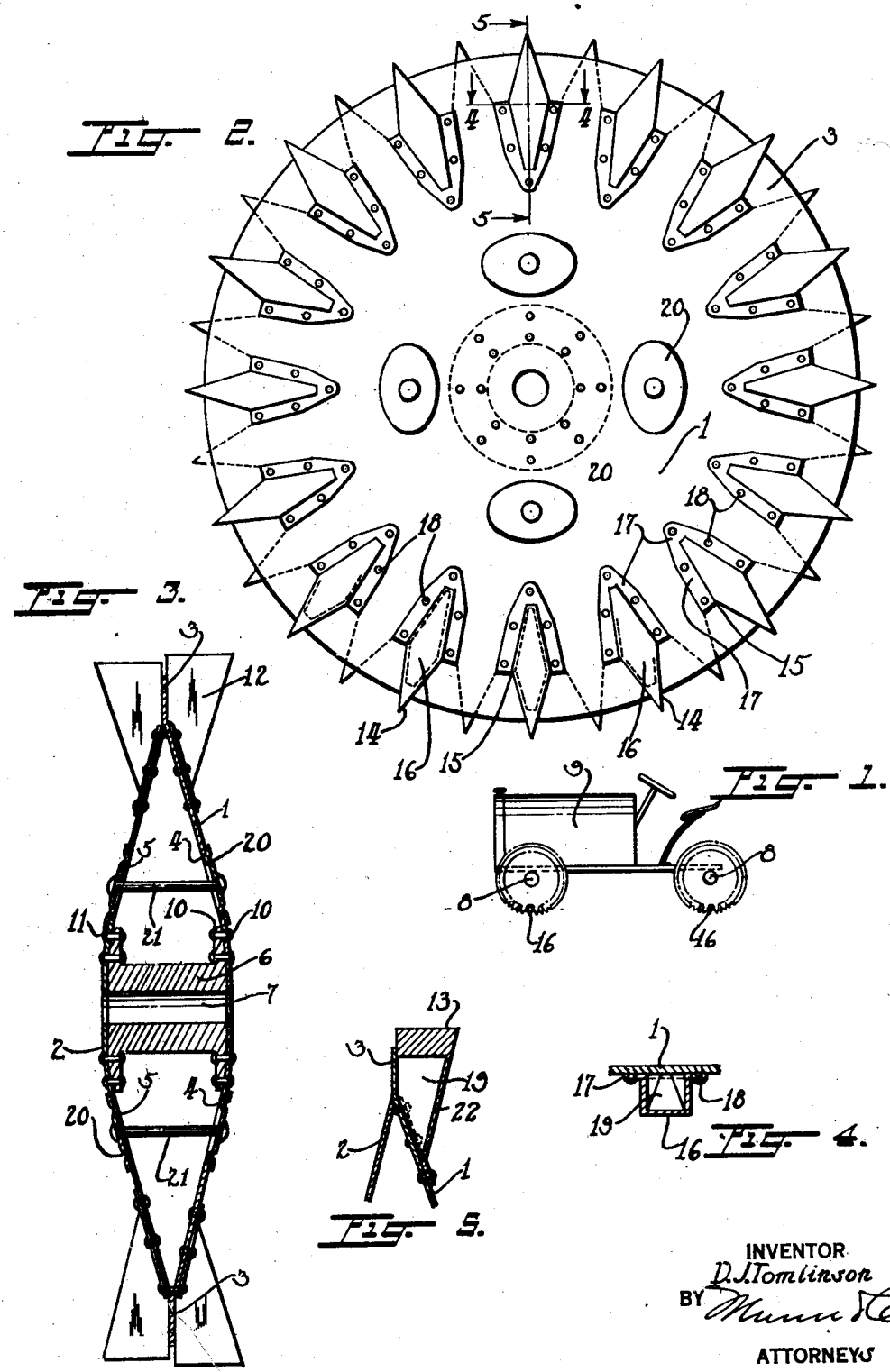

1,847,280

UNITED STATES PATENT OFFICE

DELBERT J. TOMLINSON, OF GENESEO, ILLINOIS

TRACTOR WHEEL

Application filed October 15, 1928. Serial No. 312,665.

My invention relates to improvements in tractor wheels, and it consists in the combinations, constructions, and arrangements herein described and claimed.

An object of my invention is to provide a tractor wheel which is so constructed that dirt is prevented from assembling thereupon as is common with the ordinary type of tractor wheels.

A further object of my invention is to provide a device of the type described in which positive traction is maintained at all times irrespective of the condition of the ground over which the tractor is traveling.

A further object of my invention is to provide a device of the type described which has novel means for loosening the ground instead of packing the ground as is common with the ordinary type of tractor.

A further object of my invention is to provide a device of the type described which is simple in construction, durable, and efficient for the purpose intended.

Other objects and advantages will appear in the following specification, and the novel features of the invention will be particularly pointed out in the appended claims.

My invention is illustrated in the accompanying drawings, forming part of this application, in which Figure 1 is a side elevation of a tractor embodying my invention, Figure 2 is an enlarged side elevation of the tractor wheel, Figure 3 is a vertical sectional view of the tractor wheel, Figure 4 is a section along the line 4—4 of Figure 2, and Figure 5 is a section along the line 5—5 of Figure 2.

In carrying out my invention, I provide a relatively large disc 1 and a relatively small disc 2. The only difference between the discs 1 and 2 is that the disc 1 is provided with an annular flange 3 at the periphery thereof. The discs 1 and 2 are provided with openings 4 and 5, respectively. A hub 6 having an opening 7 therein arranged to receive the axle shafts 8 of the tractor 9 is provided with annular flanges 10. The hub 6 is disposed between the discs 1 and 2 and is rigidly secured thereto by any suitable means, such as rivets 11. The periphery of the disc 2 may be firmly secured to the disc 1, if so desired, by any suitable means, such as welding.

A multiplicity of teeth 12 is provided. The teeth 12 are provided with cutting edges 13 and supporting walls 14 which extend outwardly in transverse directions, forming a cutting portion which is V-shaped in longitudinal section. The walls 14 extend inwardly from the edges indicated at 15. An outer wall 16 is integral with the walls 14. A flange 17 is integral with the walls 14 and is rigidly secured to the discs 1 or 2 by any suitable means, such as rivets 18. When the teeth are secured in place, a portion of each of the teeth extends beyond the periphery of the flange 3. The portion which extends beyond the flange 3 is made solid, as illustrated in Figure 5. The remaining portions of the teeth are hollow, as illustrated at 19. A closure plate 22 extends from the cutting edge 13 to one of the converging sides, such as that at 1 in Figure 5, and is provided with an integral flange by means of which the closure plate is secured to the side.

The purpose of the openings 4 and 5 is to allow the person assembling the wheel to properly rivet the hub 6 to the discs 1 and 2. Covers, however, are provided for these openings, as indicated at 20 in Figure 3. These covers are firmly held in place by means of connecting rods or bolts 21.

From the foregoing description of the various parts of the device, the operation thereof may be readily understood. Let us assume that the wheels are disposed upon the axles 8 of the tractor 9. In rotation of the wheels, positive traction is assured in that only the edges 13, the walls 14 of the teeth, and the flange 3 of the wheel engage with the ground. Furthermore, there is no construction provided wherein the dirt may collect. It is true that dirt may collect upon the walls 14 of the teeth. However, as the teeth pass into the ground, this dirt will be forced upwardly until it is removed from the wall 14, there being no other place for the dirt to collect. Therefore, the only collection of dirt upon the walls 14 will be that small quantity which remains after the removal of the tooth from the ground.

It will also be observed that the alternately disposed teeth are spaced away from each other by means of the flange 3—thus preventing any possibility of a collection of dirt therebetween. Furthermore the walls 16 of the teeth taper inwardly from the edge 13 to the flange 17, as shown in Figure 5—thus eliminating any dirt-receiving portions.

The tapered walls 14 of the teeth provide supporting surfaces for the wheel to prevent the wheel from sinking in soft places as the tractor passes thereover. It will be observed that these surfaces tend to extend horizontally after each tooth has been moved past the vertical position in engagement with the ground. In this manner flat supporting surfaces are provided to prevent the wheel from sinking into soft places.

I claim:

1. The combination with a wheel having discs converging toward the periphery of the wheel and being secured together at the periphery of one disc, of a radial flange extending beyond the last-mentioned periphery, and a tooth or lug carried by the wheel, said tooth having side walls disposed at right angles to the face of the flange and converging to form a cutting edge, the inner edges of said side walls abutting said radial flange, said tooth tapering from the cutting edge inwardly toward the center of the wheel and being secured to one of the converging discs.

2. The combination with a wheel having discs converging toward the periphery of the wheel and being secured together at the periphery of one disc, of a radial flange extending beyond the last-mentioned periphery, a tooth or lug carried by the wheel, said tooth having side walls disposed at right angles to the face of the flange and converging to form a cutting edge, the inner edges of said side walls abutting said radial flange, said tooth tapering from the cutting edge inwardly toward the center of the wheel, a closure plate for closing the space between the side walls of the tooth, and integral flanges carried by said side walls and said closure plate for securing the tooth to one of said converging discs.

Signed at Geneseo, in the county of Henry and State of Illinois, this 8th day of October, A. D. 1928.

DELBERT J. TOMLINSON.